March 18, 1969 J. T. MURRAY ET AL 3,433,903
FREQUENCY COMPENSATION SYSTEM
Filed May 6, 1964

INVENTORS
JACK T. MURRAY
& HOMER D. CHILDERS
BY Hurvitz & Rose
ATTORNEYS 3,433,903

FREQUENCY COMPENSATION SYSTEM

Jack T. Murray, Fairfax, and Homer D. Childers, Springfield, Va., assignors to Melpar, Inc.. Falls Church, Va., a corporation of Delaware Filed May 6, 1964, Ser. No. 365,418
U.S. Cl. 179—100.2 17 Claims
Int. Cl. G11b *5/00;* H03d *1/22;* H04b *1/26*

ABSTRACT OF THE DISCLOSURE

A system for correcting the constant percentage frequency deviation occurring over a band of frequencies as a result of relative motions, such as non-uniform movement of a magnetic tape recording past a reproducing head or velocity changes between transmitter and receiver in a communication system, in which a reference frequency is derived having the same percentage deviation in frequency as occurs in the band of interest, and the reference frequency is then selectively converted to a frequency corresponding to the center frequency of the band or approximately so, the conversion frequency also having the aforementioned percentage frequency deviation. The conversion frequency is translated by a fixed amount to still another frequency, which is predetermined for use as a local oscillator frequency suitable for mixing with the band of frequencies, while preserving the percentage frequency deviation only as to the conversion frequency prior to translation. Frequencies in the band are then shifted to other frequencies for mixing with the local oscillator frequency to generate a new band of frequencies with the percentage frequency deviation removed therefrom.

The present invention relates to systems for compensating frequency variations introduced in analyzing F.M. signals and more particularly to a system that compensates exactly for the center frequency of an analyzed spectrum and includes a single I.F. amplifier that is equally responsive to a multiplicity of spectrum center frequencies.

In the playback of data recorded on magnetic tape, frequency distortion is often introduced because the tape does not move past the playback pickup head at a constant speed. These frequency variations, termed "wow" and "flutter," introduce serious errors in the playback of telemetered F.M. data. Various systems have been designed to compensate for these errors. According to one of the prior art approaches, the frequency deviation of a reference wave recorded on the tape is obtained during playback. A measure of the deviation is multipled with the data after its has been frequency demodulated to provide the desired compensaiton. In systems of this nature, there are no direct operations on the data derived from the pick up heads. In consequence, numerous analog conversion operations are necessary and an exact correction occurs at no frequency within the spectrum analyzed.

According to the present invention, these difficulties of the prior art are overcome by providing a reference track on the record being played back. The reference track frequency is adjusted by a frequency synthesizer to selectively equal the center frequency of the analyzed spectrum. The modified reference wave and the detected data are mixed, after having been translated relative to each other by predetermined amounts. The output of the mixer is a signal that is compensated exactly at the center frequency of the analyzed spectrum. For other frequencies in the specrtum being analyzed, the error introduced by the playback system is reduced considerably over an uncompensated system.

A system of this general type is known in the art. The prior art device, however, requires a separate channel for handling every center frequency of interest. These channels include band pass filters having center frequencies selected on the basis of the center frequency of the analyzed data. The present invention obviates this requirement by the use of a frequency synthesizer that multiplies the reference frequency by the factor $N/M$, where N and M can be selectively adjusted so that the reference frequency equals the center frequency of the analyzed spectrum. To enable a single I.F. amplifier of conventional design to be utilized, such as is used in a superheterodyne receiver, the synthesizer and data head outputs are translated in frequency relative to each other by amounts that differ by the center frequency of the I.F. amplifier. Thereby, the input frequencies to the I.F. amplifier are centered around the amplifier mid band for every spectrum being analyzed, regardless of its center frequency.

According to one embodiment of the invention, the frequency synthesizer need only have a 10% bandwidth to handle every center frequency of the spectra being analyzed. In consequence, mixers and filters responsive to the synthesizer output need only have a similar bandwidth to handle all frequencies of interest and the problem of harmonics from the synthesizer interferring with frequencies of interest can be obviated with suitable filtering. The synthesizer bandwidth requirement is attained by multiplying the reference frequency and mixing the synthesizer output twice, with two sources having their frequencies displaced by the center frequency of the I.F. amplifier. To obtain an input to the I.F. amplifier having the same center frequency as the amplifier, the frequency multiplier output is heterodyned with the detected F.M. data and the resultant sum frequency is beat with the synthesizer output after the second mixing operation.

In view of the above, it is a principal object of the present invention to correct for the constant percentage frequency variation or deviation occurring over a band of frequencies, from whatever cause, by deriving a reference frequency having the same percentage frequency deviation, and selectively synthesizing therefrom a frequency corresponding to the center frequency of the band, with retention of that percentage deviation, by multiplying the derived reference frequency by a scaling factor of selected value. The synthesized frequency may then be translated to a new frequency for use as a local oscillator frequency by which to obtain an intermediate frequency having no percentage frequency deviation and about which the frequencies in the band of interest lie, with substantially all of the percentage frequency deviation cancelled therefrom also.

It is another object of the present invention to provide a new and improved system for compensating frequency variations in F.M. tape recorder playback systems.

Another object of the invention is to provide a new and improved F.M. tape playback frequency compensation system wherein the data signal is directly operated upon by a correction factor so that exact correction is provided for one frequency of the spectrum analyzed.

A further object of the invention is to provide a new and improved system for compensating frequency errors introduced in the playback of magnetic records wherein the same circuitry may be utilized for a multiplicity of spectrums having differing center frequencies.

An additional object of the present invention is to provide a new and improved system for compensating frequency variations occurring in F.M. tape playback apparatus, which system is inexpensive to design as well as manufacture and utilizes generally available components.

The above and still further objects, features and advantages of the present invention will become apparent upon consideration of the following detailed description of one specific embodiment thereof, especially when taken in conjunction with the accompanying drawing, wherein.

Figures 1, 2:
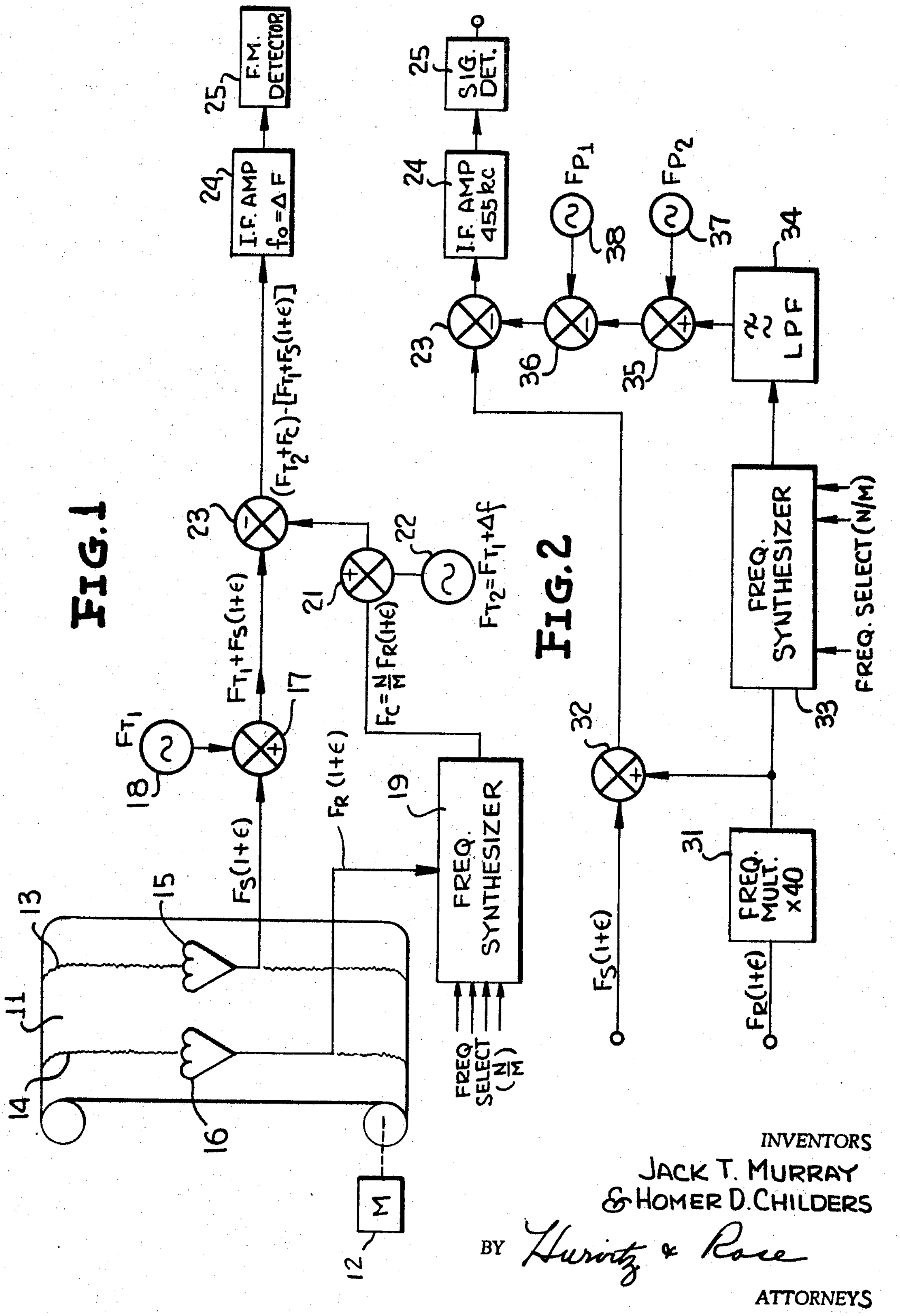
FIGURE 1 is a circuit diagram of one preferred embodiment of the invention.
FIGURE 2 is a circuit diagram of another embodiment of the invention.

Reference is now made specifically to FIGURE 1, in which is schematically illustrated a system for correcting the constant percentage frequency deviation over the band of frequencies encompassing signals recorded, for example, on a magnetic tape recorder, and wherein the reference numeral 11 indicates a magnetic record driven by constant speed motor 12. On record 11, there is provided a pair of tracks 13 and 14, the former having thereon frequency modulated information (at frequency $F_S$) of the type derived from a telemetry link and the latter a wave of reference frequency, $F_R$. The center frequency, $F_{S_0}$, of the spectrum recorded on track 13 is known and in a typical example is 3000 cycles. The frequency $F_{S_0}$ is not restricted to this value but may be any value between 0 c.p.s. and 5,000 c.p.s. The present invention is adapted to handle any frequency within this range.

The records on tracks 13 and 14 are picked up by conventional magnetic heads 15 and 16, respectively. As the speed of motor 12 varies, at starting and/or during its normal running operation, the frequencies of the signals detected by heads 15 and 16 do not correspond with the frequencies originally applied to the record. This frequency variation or percentage error, $\epsilon$, termed wow and flutter, is identical for tracks 13 and 14 at any time. Thereby, the signals deriving from heads 15 and 16 are of frequencies $F_S(1+\epsilon)$ and $F_R(1+\epsilon)$.

The output signal of head 15 is applied to heterodyner 17 that is also supplied with frequency $F_{T_1}$ (typically on the order of 5,000 mc.) from local oscillator 18. Mixer 17 includes a band pass filter designed to select only the upper sideband, $F_{T_1}+F_S(1+\epsilon)$ of the product of its two inputs.

The signal deriving from pick-up head 16 is applied to frequency synthesizer 19 that multiplies and divides the frequency of its input by a selected factor $N/M$. Factor $N/M$ is selected from any one of a plurality of integers such that $$\frac{N}{M}F_R=F_{S_0}$$

Since $F_{S_0}$ may have several different values, depending upon the subcarrier frequency of the telemetry link, it is important to provide synthesizer 19 with many different frequency selection factors $N/M$. The otput of synthesizer 19 having a frequency $$F_c=\frac{N}{M}F_R(1+\epsilon)$$

is applied as one input to heterodyner 21, which is also responsive to local oscillator 22. The frequency of local oscillator 22, $F_{T_2}=F_{T_1}+\Delta f$, is selected to differ from $F_{T_1}$ by a typical I.F. frequency, 455 kc., so that a conventional I.F. amplifier may be utilized, as seen infra. Heterodyner or amplitude modulator 21 includes a band pass filter to select the upper sideband of the product of its inputs so that a signal having a frequency of $$F_C+F_{T_2}=F_{T_1}+\Delta f+\frac{N}{M}F_R(1+\epsilon)$$

is derived from it.

The outputs of amplitude modulators 17 and 21 are applied to mixer 23 from which a difference frequency $(F_{T_2}+F_C)-[F_{T_1}+F_S(1+\epsilon)]$ is derived. The expression for the difference frequency can be rewritten as $$\left[F_{T_1}+\Delta f+\frac{N}{M}F_R(1+\epsilon)\right]-[F_{T_1}+F_S(1+\epsilon]$$

which simplifies to $$\left[\Delta f+\frac{N}{M}F_R(1+\epsilon)-F_S(1+\epsilon)\right]$$

Since $$\frac{N}{M}F_R$$

is selected to equal $F_{S_0}$, it is seen that for $F_s=F_{S_0}$, the output frequency of mixer 23 equals $\Delta f$. As $F_S$ deviates from $F_{S_0}$, the frequency deriving from mixer 23 varies about $\Delta f$. The difference frequency is applied to a conventional I.F. amplifier 24 having a center frequency of $\Delta f$ and a bandwidth twice that of the maximum frequency variation of $F_S$ about $F_{S_0}$. Amplifier 24, which may, therefore, be of the type usually found in superheterodyne receivers, is thus able to handle every record picked up by head 15, regardless of the center frequency of the recorded spectrum. From amplifier 24, the signal is applied to a conventional F.M. detector 25 that generates a D.C. signal proportional to the frequency by which the I.F. amplifier deviates from $\Delta f$.

The frequency of the signal passing through amplifier 24, relative to the amplifier center frequency, corresponds very closely to the correct frequency $F_S$ on record 13. As seen supra, for $F_S=F_{S_0}$, the input to amplifier 24 is of frequency $\Delta f$ which results in a zero voltage output from detector 25.

The accuracy of the present system for $F_S\neq F_{S_0}$ can be realized by considering an example. Assume that $F_{S_0}=2500$, $F_S=2200$ and $\epsilon=0.1$. Under these conditions, the signal deriving from head 15 is 2420 c.p.s. (i.e., $2200+0.1\cdot2200$). A conventional, uncompensated system indicates that $F_S$ differs from $F_{S_0}$ by only 80 c.p.s., not 300 c.p.s., an error of 367%. According to the present invention, these conditions result in amplifier 24 deriving a frequency 330 cycles from its center frequency, $\Delta f$. This results in a 30 cycle or 10% error being derived from the system. Thus, a great reduction in the error produced as a result of wow and flutter in playback is effected.

Reference is now made to FIGURE 2 of the drawings wherein the output of frequency synthesizer 19 need be considered only over a 10% frequency range. This is in contrast with the configuration of FIGURE 1 wherein the synthesizer output is in excess of an octave, thereby precluding the effective use of a filter for the synthesizer output. It has been found that synthesizer harmonic content, while 30 db below the frequency of interest, should be removed with suitable filtering for accurate system operation.

In FIGURE 2, the reference frequency deriving from head 16 is multiplied in frequency multiplier 31 by a constant factor A, with the resultant $AF_R(1+\epsilon)$ applied in parallel to mixer 32 and frequency synthesizer 33. Selection factor, $N/M$, of synthesizer 33 is adjusted to equal $(1+F_{S_0}/AF_R)$ so the synthesizer output frequency covers the same range as the sum frequency deriving from mixer 32.

The synthesizer output is coupled to low pass filter 34, having a cut off frequency designed to attenuate frequencies outside the band of interest. In a typical embodiment, $F_R=25$ kc., $A=40$, and the fundamental frequency output of synthesizer 33 varies between 1.010 and 1.1110 mc., so the cut off frequency of filter 34 is in the range of 1.5 mc. Thereby, harmonics of synthesizer 33 which are of low amplitude, generally at least −30 db relative to the fundamental, are completely blocked by filter 34.

The output of filter 34 is applied to cascaded mixers 35 and 36. Mixers 35 and 36 are supplied with waves of frequency $F_{P_1}$ and $F_{P_2}$ by local oscillators 37 and 38, respectively. $F_{P_1}$ and $F_{P_2}$ are adjusted so that their difference, $F_{P_1}-F_{P_2}$, equals $\Delta f$, center frequency of I.F. amplifier 24. Mixers 35 and 36 are designed to derive the sum and difference frequencies, respectively, of the waves heterodyned therein so the center of the difference frequency spectrum deriving from mixer 23 coincides with the center frequency of amplifier 24. Two separate oscillators and mixers are employed between filter 34 and heterodyner 23, rather than one mixer responsive to a wave at the center frequency of I.F. amplifier 24. This is because an oscillator at the I.F. amplifier center frequency would cause a large signal to be erroneously induced in amplifier 24.

To describe the operation of FIGURE 2, the signal frequency applied to mixer 32 may be expressed as $F_S(1+\epsilon)$ and the reference frequency applied to multiplier 32 may be expressed as $F_R(1+\epsilon)$. The output frequencies of mixer 32 and synthesizer 33 are $$[(F_S+AF_R)(1+\epsilon)]$$

and $$\left[AF_R\frac{N}{M}(1+\epsilon)\right]$$

respectively. The output frequency of synthesizer 33 is translated by mixers 35 and 36 into $$\left[AF_R\frac{N}{M}(1+\epsilon)-\Delta f\right]$$

which is mixed in heterodyner 23 with the signal deriving from mixer 32 to produce frequency $$\left[\left(AF_R+F_S-AF_R\frac{N}{M}\right)(1+\epsilon)+\Delta f\right]$$

Since $$\frac{N}{M}=1+\frac{F_{S_0}}{AF_R}$$

the input to amplifier 24 may be expressed as $$(F_S-F_{S_0})(1+\epsilon)+\Delta f$$

Thus for $F_S=F_{S_0}$, the signal propagating through amplifier 24 contains no error, no matter what value $\epsilon$ may have.

While the present invention has been described in connection with wow and flutter correction, it can also be utilized for correcting errors introduced in an F.M. telemetry system located on a vehicle. Thus in a missile monitoring system, frequency errors are introduced in the transmitted intelligence by Doppler effect as the missile velocity changes. These errors can be corrected with the present invention by transmitting a predetermined reference frequency along with the data frequencies. The reference and data frequencies are applied to the system of the present invention as $F_R(1+\epsilon)$ and $F_S(1+\epsilon)$, respectively, where $\epsilon$ is the Doppler frequency error.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for compensating against frequency variations in F.M. data with waves of reference frequency having the same variations, said data having a predetermined center frequency $F_{S_0}$ when there are zero variations, said reference frequency being $F_R$ when there are zero variations, comprising means responsive to said reference frequency for selectively modifying said reference frequency to the value $KF_R=F_{S_0}$ with said variations, where K is a multiplying factor whose value is different from unity and is selected to scale the reference frequency to said center frequency, means for translating the relative frequencies of the signals derived from said means for modifying and the F.M. data by $\Delta f$, means for mixing the translated signals to derive difference frequencies in a band centered about the frequency $\Delta f$ and to remove said frequency variations from said difference frequencies, and an I.F. amplifier of center frequency $\Delta f$ responsive to said difference frequencies.

2. The system of claim 1 wherein $K=N/M$, where N and M are integers having a ratio at least approximately equal to the ratio of $F_{S_0}$ to $F_R$, and said means for modifying includes means for selecting different values of K for data channels having different center frequencies.

3. The system of claim 1 wherein said means for modifying includes first means for multiplying the reference frequency by A, means for adding the frequency of the F.M. data with the output of said first means for multiplying, said means for modifying including second means for multiplying the output frequency of said first means for multiplying by B, where $$B=1+\frac{F_{S_0}}{AF_R}$$

4. The system of claim 3 further including a filter responsive to the output of said second multiplying means.

5. The system of claim 1 wherein said means for translating includes a pair of mixers, each supplied with a separate source of reference waves, said reference waves differing in frequency by $\Delta f$.

6. A system for compensating frequency variations introduced by playback of data records having F.M. data and reference frequency tracks recorded thereon, said data track having a predetermined center frequency $F_{S_0}$ when said variations are zero, said reference frequency being $F_R$ when said variations are zero, said playback system introducing identical frequency errors $\epsilon$ in the signals derived from said reference and data tracks, whereby the playback frequency of the data and reference tracks are $(1+\epsilon)F_S$ and $(1+\epsilon)F_R$ respectively, comprising means responsive to signal picked up from the reference track for deriving a frequency of $KF_R(1+\epsilon)$, where $K\neq 1$ and $KF_R=F_{S_0}$, means responsive to the output of said last named means for translating the frequency thereof relative to said data frequency by a factor $\Delta f$, means for mixing the translated frequencies to derive a frequency $\Delta f+F_S(1+\epsilon)-KF_R(1+\epsilon)$, and an I.F. amplifier having a center frequency $\Delta f$ responsive to said means for mixing.

7. The system of claim 6 wherein $K=N/M$, where N and M are integers, and said means responsive to said reference frequency includes means for selecting different values of K for data tracks having different center freqencies.

8. The system of claim 6 further including an F.M. detector responsive to the signal deriving from said I.F. amplifier, said detector deriving a voltage of reference level when the output frequency of the amplifier equals $\Delta f$.

9. The system of claim 6 wherein said means for deriving a frequency $KF_R(1+\epsilon)$ includes first means for frequency multiplying the reference frequency by a constant A, means for adding the frequency of the F.M. data with the output of said first means for multiplying, said means for modifying including second means for multiplying the output frequency of said first means for multiplying by a constant B, where $$B=1+\frac{F_{S_0}}{AF_R}$$

10. A playback system for compensating frequency variations introduced by wow and flutter comprising a magnetic record having a reference track and a data track thereon, means for picking up the signals on said track, the signal picked up from the reference track having a constant frequency $F_R$ when there is no wow and flutter, the signal picked up from the data track having a varying frequency $F_S$ centered about $F_{S_0}$ when there is no wow and flutter, said $F_R$ and $F_S$ frequencies being modified to equal $(1+\epsilon)F_R$ and $(1+\epsilon)F_S$ when wow and flutter are introduced, where $\epsilon$ is an error factor, means responsive to the signal picked up from the reference track for deriving a frequency of $KF_R(1+\epsilon)$, where K differs from unity and $KF_R=F_{S_0}$, means responsive to the output of said last named means for translating the frequency thereof relative to the signal picked up from the data track by a factor $\Delta f$, means for mixing the translated frequencies to derive a frequency $$\Delta f+F_S(1+\epsilon)-KF_R(1+\epsilon)$$

and an I.F. amplifier having a center frequency of $\Delta f$ responsive to said means for mixing.

11. The system of claim 10 wherein $K=N/M$, where N and M are integers, and said means responsive to said reference frequency includes means for selecting different values of K for data tracks having different center frequencies.

12. The system of claim 10 further including an F.M. detector responsive to the signal deriving from said I.F. amplifier, said detector deriving a voltage of reference level when the output frequency of the amplifier equals $\Delta f$.

13. A system for correcting frequency deviations constituting a uniform percentage variation of frequency over a band of frequencies of interest, comprising means for deriving a reference frequency different from the center frequency of said band and having the same percentage frequency deviation as occurs in said band; means for selectively multiplying said reference frequency by a predetermined conversion factor to generate a frequency corresponding at least approximately to the center frequency of said band, and having said percentage deviation; means for translating said generated frequency to a further frequency displaced therefrom by a preselected value, and retaining said percentage deviation only as to said generated frequency; means for shifting the frequencies in said band by a portion of said preselected value; and means for mixing said further frequency with said shifted band of frequencies to produce a desired center frequency corresponding to the difference between said preselected value and said portion thereof and having said percentage frequency deviation substantially cancelled therefrom, and with said band of frequencies shifted to occupy a new band having said desired center frequency and having said percentage deviation substantially cancelled from the frequencies therein.

14. The invention according to claim 13 wherein said means for selectively multiplying comprises a frequency synthesizer having a plurality of different conversion factors available for selective multiplication with said reference frequency depending upon the particular center frequency to be synthesized.

15. The invention according to claim 14 wherein the first-named band of frequencies encompasses signals stored on a recording medium, means for reproducing stored signals in response to relative movement of said recording medium, means for moving said medium with respect to said reproducing means, and wherein said reference frequency is stored as a signal on a separate track of said recording medium.

16. The invention according to claim 15 wherein is further provided an intermediate frequency amplifier responsive to said new band of frequencies and having a center frequency corresponding to said desired frequency, and a detector for demodulating signal passed by said amplifier.

17. In a system for correcting constant percentage frequency deviations experienced by signals in a predetermined frequency band during translation between points undergoing relative motion, the combination comprising means for deriving a reference signal having a frequency different from the center frequency of said band and having said percentage frequency deviation, means for selectively translating the frequency of said reference signal to a value corresponding to the center frequency of said band, means for shifting the relative frequencies of said signals and said translated reference signal by a preselected frequency corresponding to the center frequency of a new band within which said signals are to be processed, and means for mixing the shifted signals and reference signal to produce signals in said new band and to substantially cancel said percentage frequency deviations.

References Cited

UNITED STATES PATENTS

| | | | |
|---|---|---|---|
| 2,212,338 | 8/1940 | Bown | 325—430 |
| 3,084,011 | 4/1963 | Palic | 179—100.2 |
| 3,182,132 | 5/1965 | Barnes | 325—49 |

BERNARD KONICK, *Primary Examiner.*

J. R. GOUDEAU, *Assistant Examiner.*

U.S. Cl. X.R.

325—432; 329—154